United States Patent [19]  
Biermeier et al.

[11] Patent Number: 4,714,972  
[45] Date of Patent: Dec. 22, 1987

[54] HOUSING FOR A MAGNETIC DISK MEMORY HAVING A DISK PACK SEAT AT OPPOSITE SIDES OF THE DISK PACK

[75] Inventors: Johann Biermeier, Munich; Wilhelm Brand, Rosenheim, both of Fed. Rep. of Germany

[73] Assignee: Siemens Aktiengesellschaft, Berlin and Munich, Fed. Rep. of Germany

[21] Appl. No.: 696,203

[22] Filed: Jan. 29, 1985

[30] Foreign Application Priority Data

Feb. 7, 1984 [DE] Fed. Rep. of Germany ....... 3404223

[51] Int. Cl.⁴ .......................... G11B 5/012; G11B 5/54
[52] U.S. Cl. ....................................... 360/97; 360/98; 360/106
[58] Field of Search ............................. 360/86, 97–99, 360/133, 137, 135; 369/75.1; 346/137

[56] References Cited

U.S. PATENT DOCUMENTS 4,331,991  5/1982  Morehouse et al. ................ 360/106
4,544,973 10/1985  Van de Bult ........................ 360/106

FOREIGN PATENT DOCUMENTS 57-98166   6/1982  Japan ..................................... 360/97
57-191879 11/1982  Japan ................................... 360/104
58-102364  6/1983  Japan ..................................... 360/97
2107107    4/1983  United Kingdom ................. 360/97

Primary Examiner—Stuart N. Hecker  
Assistant Examiner—Benjamin E. Urcia  
Attorney, Agent, or Firm—Hill, Van Santen, Steadman & Simpson

[57] ABSTRACT

A housing for a magnetic disk memory comprising a disk pack rotatably seated at both sides and a rotational positioner is subdivided along a parting plane parallel to the axes of the disk pack and the rotational positioner, being subdivided into a tub-shaped supporting shell and into a cover. Both bearing locations for the disk pack lie just within the edge of the supporting shell and the immersion depth of the rotational positioner into the supporting shell is as small as possible. As a base, the supporting shell comprises an end wall inclined at a predetermined angle relative to the parting plane, the inside of the end wall, however, comprising an attachment surface aligned parallel with the parting plane in the attachment region of the rotational positioner. Outwardly directed webs are provided on the outer surface of the end wall and extend at right angles with respect to one another for the purpose of reinforcement.

10 Claims, 3 Drawing Figures

HOUSING FOR A MAGNETIC DISK MEMORY HAVING A DISK PACK SEAT AT OPPOSITE SIDES OF THE DISK PACK

CROSS REFERENCE TO RELATED APPLICATIONS

This application is related to the following applications:
Ser. No. 696,202, filed Jan. 29, 1985
Ser. No. 696,184, filed Jan. 29, 1985
Ser. No. 696,205, filed Jan. 29, 1985
Ser. No. 696,207, filed Jan. 29, 1985
Ser. No. 696,204, filed Jan. 29, 1985.

BACKGROUND OF THE INVENTION

1. Field of the Invention

The present invention relates to a housing for a magnetic disk memory which comprises a disk pack seated on opposite sides of the housing and driven by a motor, and a magnetic head positioner head apparatus designed as a rotational positioner whose rotational axis is disposed parallel to the axis of the disk pack.

2. Description of the Prior Art

A distinction is generally made in magnetic disk memories between fixed disk memories and interchangeable disk memories. Technical development is continuing to proceed in the direction of higher and higher storage capacities, both with respect to a track density and the bit density as the characteristics for the storage capacity per disk surface, on the other hand, as well as in view of the mechanical structure in order to be able to accommodate as many disks as possible in a prescribed mounting space, on the other hand.

An example of this is the so-called 5¼" fixed disks memory whose magnetic disk have a outer diameter of 130 mm and an inner diameter of 40 mm according to the German industrial standard. Analogous to the dimensions of competing floppy disk drives, a mounting space having a mounting height of 82.5 mm and a base area of 146 mm×203 mm has crystallized for this type of storage as a uniform size which is available for the overall apparatus, including the housing and the appertaining electronics.

The desire to accommodate as many magnetic disks as possible in this prescribed mounting space is subordinate to the developmental goal of higher storage capacities and to the efforts to increase the recording density on the magnetic disk themselves. Within the scope of this structural desirability, embodiments of 5¼" fixed disk memories have been disclosed in which the drive motor for the disk pack has been miniaturized to such a degree and has been structurally designed such that it can be built into the hub of the disk pack, even given a prescribed inner diameter of 40 mm for the disk packs. An element which has a significant co-determining effect on the overall height of conventional fixed disk memories is therefore integrated into the hub of the magnetic disk pack and the overall height exploitable for the disk pack is thus expanded. Based on current conditions in the size of the combined magnetic heads and of the disk thickness, disk packs which contain up to eight magnetic disks stacked on top of one another have therefore become possible for 5¼" disk drives. The remaining overall height is required for the housing and the device electronics.

In order to guarantee adequate operating reliability given justifiable manufacturing costs, the desired, compact structure and high recording density on the magnetic disks necessitate special design measures. Given the dimensions of the disk pack, this can only be achieved with a housing which is designed stiff with respect to vibration.

SUMMARY OF THE INVENTION

It is therefore a main object of the invention to provide such a housing structure for a magnetic disk memory having a low production-engineering expense in order to achieve an advantage over competing floppy disk drives and fixed disk memories given corresponding costs per bit. It is essential in this context that the structure of the magnetic disk memory be designed such that module-oriented fabrication is possible, this allowing simple assembly and maintenance. This means that the disk pack and the magnetic head positioner, designed as a rotational positioner in the present case, should be preassembled as modules and be built into the housing as a complete and pretested unit and also be replaceable as a module in a simple manner under given conditions.

Given a housing of the type generally set forth above the above object is achieved, according to the present invention, by a housing which is characterized in that the same is sub-divided along a parting plane parallel to both the axis of the disk pack and of the rotational positioner, being sub-divided into a tub-shaped supporting shell and a cover and such that the bearing locations for the disk pack just lie within the lateral walls of the supporting shell, whereas the immersion depth of the rotational positioner into the supporting shell is as small as possible. The housing is further characterized in that the supporting shell comprises, as a floor, an end wall which is inclined, as a whole, at an angle $\alpha$ relative to the parting plane, the inside of the end wall comprising an attachment surface in the attachment region of the rotational positioner which is aligned parallel to the parting plane and the outside thereof comprising outwardly-projecting webs in the attachment region which are essentially perpendicular to the attachment surface.

It is an essential characteristic of the above structural solution that the shaping of the supporting wall assures, on the one hand, the required stability against vibration during operation and, on the other hand, creates the preconditions for the fact that cumulative tolerances are avoided as far as possible. This is provided in that all essential reference dimensions which define the unequivocal parallelism and concentricity of the bearing locations of the disk pack and which also determine the geometrical allocation of the disk pack and the rotational positioner to lie in one and the same part of the housing. Mutually allocated centering offsets or mounting stops in the various levels of the supporting shell with which complicated adjustments are avoided when assembling the magnetic disk memory can therefore be easily provided with an expense that is justifiable in terms of production and engineering.

The design and position of the parting plane between the supporting shell and the cover of the housing, which also forms one of the defining reference planes for the tolerances, sees to it, on the one hand, that the attachment region for the rotational positioner in the end face of the supporting shell does not lie too low, which would be unfavorable in the manufacture of the supporting shell as well as in the assembly of the rotational positioner. On the other hand, this feature of the diagonal position of the parting plane enables good accessibility of the magnetic disk pack when the cover is removed. Presuming a dust-free environment, the device can also be placed in operation in this condition. The disk pack can therefore be balanced under optimum conditions and servo-information can be written onto disk surfaces in the completely assembled condition; over and above this, general operation monitoring is possible. Due to the sensitivity of the magnetic disks to dust, it is generally not provided that the magnetic disk memories be opened in situ (e.g. on customeer premises) in order to undertake potential maintenance work. It is nonetheless incontestably advantageous for the execution of assembly and maintenance operations when the magnetic disk pack and the positioner are fully accessible. Certain tests and controls can be executed under operating conditions only in such a manner.

In addition to the foregoing, the supporting shell, which is preferably manufactured as a cast part, comprises sufficient cross-sections which not only guarantee the desired vibrational stiffness but also facilitate a fast temperature compensation. Undesired, non-uniform thermal expansions which represent one of the sources of error in the operation of magnetic disk memories are therefore diminished.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
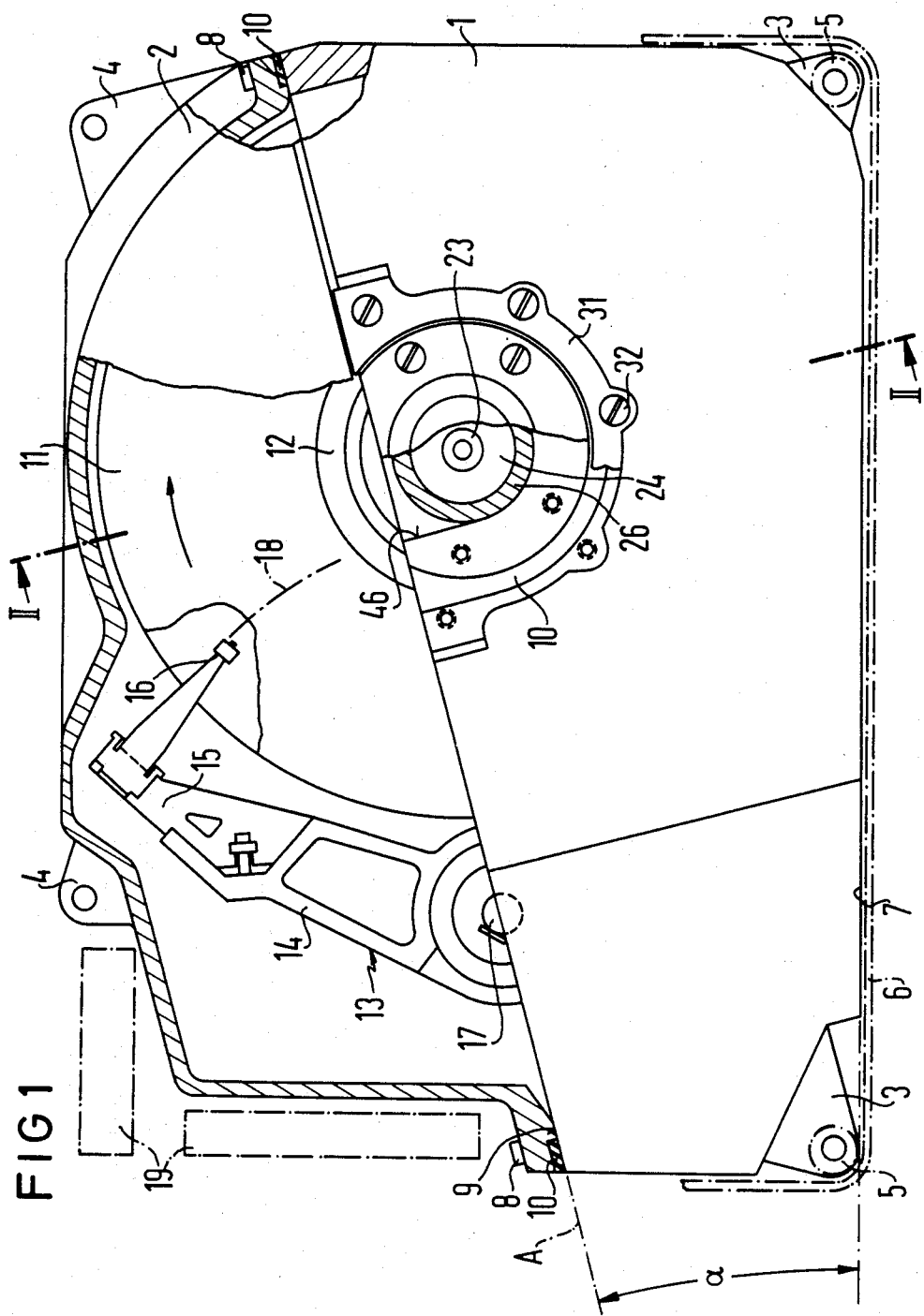
FIG. 1 is a bottom plan view showing a housing for a magnetic disk memory, partially in section, comprising a tub-shaped supporting shell which accepts the magnetic disk pack and comprising a cover in place thereon.
Figure 2:
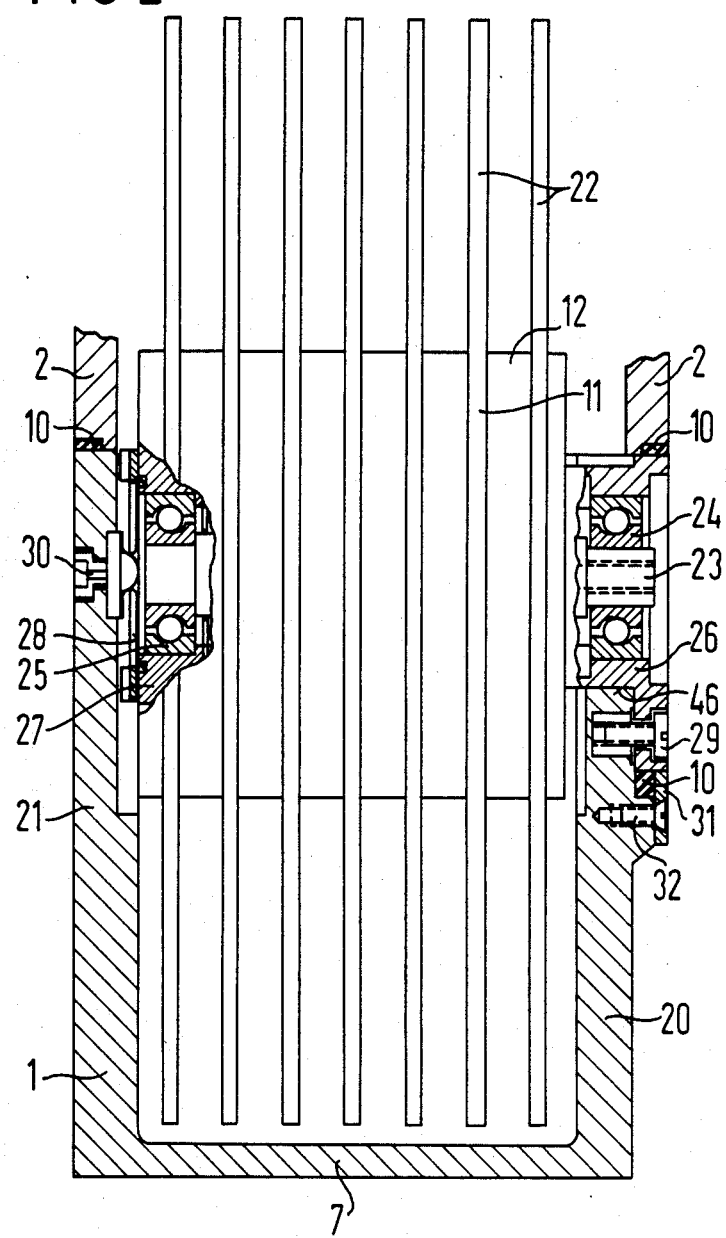
FIG. 2 is a sectional view through the housing substantially along the parting line II—II of FIG. 1 whereby the disk pack is essentially shown in elevation and not cut for reasons of clarity.

Referring to FIG. 1, the housing of a magnetic disk memory is shown divided along a diagonally extending parting plane A into a supporting shell 1 and a cover 2. In FIG. 2, a sectional view substantially through the axis of rotation of the disk pack is illustrated. The housing is essentially a rectangular box. The supporting shell 1 and the cover 2 comprise respective fastening eyelets or bosses 3, 4 with which the housing, as schematically indicated, can be suspended via rubber bumpers 5 in an orbital frame 6 in a resiliently-yielding manner. The magnetic disk memory can, for example, be built into a data processing device via this frame.

The cover 2 is seated at the parting plane A on the supporting shell 1 and is releasably connected thereto by way of fastening screws, the parting plane 8 being inclined by an angle α relative to an end wall 7 of the supporting shell 1. The connection between the cover and the supporting shell should be dust-tight and simultaneously create an adequate shielding from high-frequency noise signals. To this end, the edge of the cover 2 lying in the parting plane is designed such that it comprises a planar metal sealing surface 9 and an outwardly disposed bezel into which a circumferential seal 10 is inserted. When the cover 2 is screwed to the supporting shell 1, the sealing surface 9 is applied to the edge of the supporting shell 1 and thus provides the high-frequency shielding; at the same time, the elastic seal 10 is pinched and the desired dust-free seal is achieved.

The cover 2 is shown partially cut in order to show the described solution of the sealing problem and also in order to show the interior of the magnetic disk memory and, therefore, its essential component parts. Visible as a result of the partial section is a disk pack 11 which, as schematically indicated, is disposed on a hub 12 and rotates in the clockwise direction as illustrated by an arrow. A rotational positioner 13, which is shown in its operating position, is disposed laterally adjacent the disk pack 11. It comprises a positioner arm 14 with head base plates 15 which carry magnetic heads 16 constructed in thin-film technology and fixed thereto. A pivot axis 17 of the rotational positioner is barely visible in FIG. 1. Its spacing from the magnetic heads 16 defines a pivot radius 18 shown as a dot-dash line.

The partial section of the cover 2 selected in FIG. 1 allows the shape of the cover to be seen, this being selected, designed, and constructed on the one hand, such that it surrounds the disk pack at a slight spacing therefrom and, on the other hand, such that it still leaves adequate space for the motion of the positioner arm 14 even for sensing outer tracks of the disk pack 11. The cover 2 is thereby constricted in the region of the rotational positioner 13 extending from the end face, so that a possibility of disposing hybrid components 19 on the surface of the cover 2 in the free corner derives, the hybrid components 19 being merely indicated on the drawing by dot-dash lines since they do not form an immediate part of the housing.

The partial section selected in FIG. 1, however, also shows the significance of the chosen position and inclination of the parting plane A. The parting plane A is located, on the one hand, such that all structurally-essential function means are united in the supporting shell 1, this particularly applying to the two-sided bearing of the disk pack 11 and also to the fastening of the rotational positioner. On the other hand, the parting plane A is located as close to and parallel to the axis of the disk pack 11 and is also inclined by the angle α, so that the mounting depth for the rotational positioner 13 is optimized in view of fabrication and assembly. Good accessibility to the function-defining components of the magnetic disk memory is achieved with this structural principle.

This shall now be explained in greater detail with reference to FIGS. 2 and 3. FIG. 2 is a sectional view through the housing along the parting line II—II of FIG. 1 whereby, for reasons of clarity, the scale has been enlarged, the cover 2 has been essentially omitted and the disk pack 11, except for the bearing location, has been shown essentially in elevation. This is also meant to show that the disk pack 11 is inserted into the supporting shell 1 as a completely assembled component.

This section through the supporting shell 1 illustrates its tub-like shape comprising two lateral walls extending perpendicular to the end wall 7, comprising a base 20 of the supporting shell and a top 21 of the supporting shell. Each lateral part comprises a bearing location for the disk pack 11. Since the disk pack 11 is viewed as a completely preassembled unit in the present case, it appears unnecessary to explain its structural format in terms of all of its details. It should therefore be sufficient to point out that a plurality of storage disks 22 is fixed on the hub 12 with the disks having a predetemined spacing. A spindle 23 is provided coaxial of the hub 12 and comprises spindle pegs at both ends which carry ball bearings 24 and 25, respectively, with an interference fit. A respective bearing bushing 26, 27 is pressed onto the outer rings of the ball bearings with interference fits. As a seating surface for the first bearing bushing 26, the base 20 of the supporting shell comprises a slot 46 extending perpendicular to the edge of the supporting shell 1 and open towards that edge, the inwardly directed floor of the slot 46 being executed with a 180° curvature. The allocated bearing bushing 26 accordingly has just such a centering surface and is cut off parallel to the edge of the supporting shell 1.

The second bearing bushing 27, located at the opposite side of the disk pack 11, carries a membrane spring 28 on its outwardly-directed end face, the membrane spring being composed of a round spring disk and a centrally-disposed, outwardly directed end plate having a central bore. For the sake of completeness, it should be pointed out that the hub 12 of the disk pack 11 is designed as a hollow member and accepts an internal motor (not shown here) for the drive of the disk pack.

This structural unit is completely preassembled before being inserted into the supporting shell 1. The first bearing bushing 26 is thereby introduced into the described slot 46 milled into the base 20 of the supporting shell, is centered there and is fixed to the base of the supporting shell with the assistance of fastening screws 29. Lying opposite this bearing location, the top 21 of the supporting shell comprises a central bore concentric to the axis of the disk pack 11 which accepts a further fastening screw 30 with which the end plate of the membrane spring 28 is fixed to the top of the supporting shell.

A special feature of the bearing design in the base 20 of the supporting shell should be pointed out in this context. The elastic seal 10 which seals the housing in the form of a circumferential ring in the parting plane A was initially described. This seal furthermore can be designed such that, as may be seen from FIGS. 1 and 2, it comprises an annularly-designed lateral projection in the region of the bearing location of the disk pack 11 in the base 20 of the supporting shell. This projecting piece by design faces the base 20 of the supporting shell so that it tightly embraces the circumference of the first bearing bushing 26. This projecting piece of the seal 10 is positively covered by a thrust collar 31 which is secured to the base 20 of the supporting shell with fastening screws 32.

Figure 3:
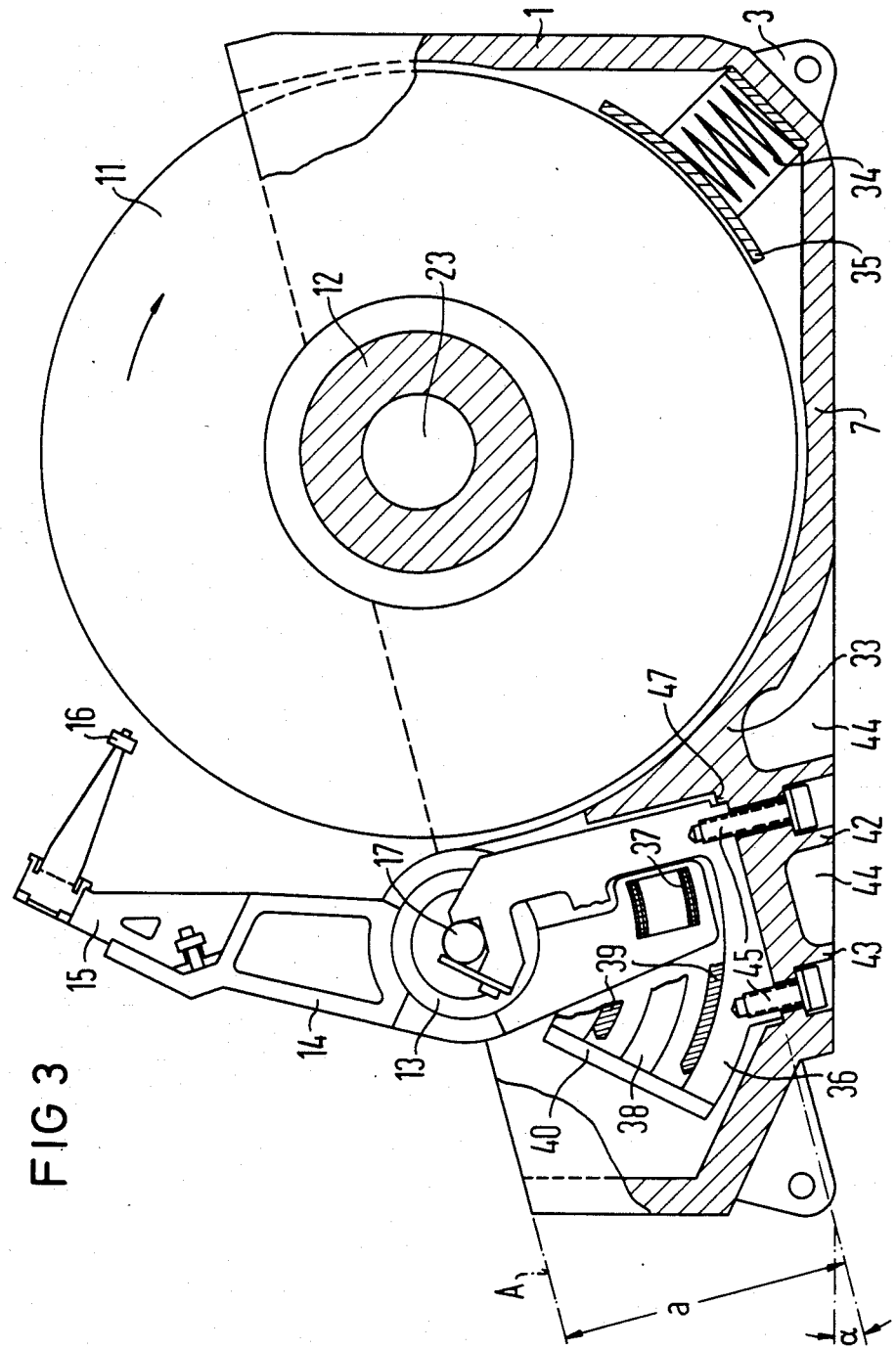
FIG. 3 is a sectional view through the supporting shell showing the arrangement of the disk pack and a rotational positioner as seen from the bottom.

Analogous to FIG. 1, FIG. 3 illustrates a bottom view of the magnetic disk memory, but now with supporting shell partially cut away such that and further details of the end wall 7 of the supporting shell and of the fastening of the rotational positioner 13 are depicted. First, the end wall 7 comprises a center web 33 projecting therefrom perpendicularly to the parting plane A whose sidewall facing the disk pack 11 follows the outer contour of the magnetic disk 22 of the disk pack 11 at a slight spacing, whereas the other side wall extends perpendicularly to the parting plane. The center web 33 subdivides the interior space formed by the supporting shell 1 and, therefore, first serves for stiffening the base 20 of the supporting shell and the top 21 of the supporting shell.

The shaping of the center web 33, however, also fulfills another function at the same time. The interior space of the housing surrounding the disk pack 11 is designed such that it essentially encompasses the disk pack 11 at a slight radial spacing. This shaping serves the purpose of intensifying and guiding the air flow in the rotational direction that arises given a rotating disk pack 11. The circulatory air flow in the channel between the edge of the disk pack 11 and the housing is exploited in order to constantly filter the air in the interior of the magnetic disk memory during the operation thereof. To this end, an air filter 34 is disposed transversely relative to the air flow in the lower right-hand corner of the supporting shell 1, the air filter 34 comprising a guide element 35 at its inner end face which simulates the contour of the disk pack 11 in order to intensify the filter function.

The rotational positioner 13 is fixed to the end wall 7 immediately next to the center web 33 at that side facing away from the disk pack 11. To this end, the rotational positioner comprises a U-shaped pedestal 36, the pivot shaft 17 being fixed at the ends of the legs thereof. The rotational positioner 13 can be designed in accordance with the swinging coil principle, as in the present illustrative embodiment; however, it can also be designed according to the magnetic armature principle. In the present case, a swinging coil 37 is disposed and secured to the positioner arms 14, embracing a magnetic core 38. The pedestal comprises two magnets 39 between which the swinging coil 37 moves during the positioning operation and which are allocated to the magnetic core 38. A reflux plate 40 is laterally secured to the pedestal as a magnetic yoke. The pedestal 36 therefore simultaneously forms a part of the magnet system for the rotational positioner 13.

As explained above, one design object is to keep the immersion depth a of the rotational positioner 13 into the supporting shell 1 as small as possible. On the other hand, it is also more simple in terms of production engineering for the purpose of non-critical tolerances when the parting plane A, i.e. the edge of the supporting shell 1, is employed as a dimensional plane of references for the attachment region of the pedestal 36 of the rotational positioner to the end wall 7. For this reason, the wall 7 extends inwardly in this attachment region and comprises an attachment surface extending parallel to the parting plane A. This attachment surface is incised into the end wall 7 with projections 47 so that the pedestal 36 can be centered relative to the surface.

The rotational positioner 13 which is completely preassembled as a module is inserted into the supporting shell 1 in the assembly position shown in FIG. 3. In this position, in which the positioner arms 14 have a stop pressing against one of the legs of the pedestal 36, the magnetic heads 16 lie free outside of the disk pack 11. This is a significant facilitation of assembly, since the pivot-in operation is only executed when the rotational positioner 13 has already been firmly anchored in the supporting shell 1.

This design of the end wall 7 in the attachment region of the rotational positioner 13 produces the possibility of providing webs 42 and 43 on the exterior perpendicular to the parting plane, these webs, together with reinforcing ribs 44 extending perpendicularly thereto particularly stiffening the end wall 7 in the attachment region of the rotational positioner. The webs 42, 43 comprise bores which accept fastening screws 45 with which the pedestal is secured to the end wall 7.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A housing for a magnetic disk memory which comprises a disk pack including an axial spindle rotationally seated at opposite sides thereof in the housing and driven by a motor internal of the disk pack and a magnetic head rotational positioner apparatus having an axis of rotation parallel to the axis of rotation of said disk pack, said housing comprising:

a support shell and a cover mating to said support shell along a parting line spaced from and parallel to the axis of rotation of said disk pack;

said shell comprising an end wall extending at a predetermined acute angle with respect to said parting plane and first and second lateral walls extending perpendicular to said end wall and each defining a respective spindle bearing region within said support shell, said regions each including means for rotationally supporting said spindle;

said end wall including an attachment surface for said rotational positioner extending parallel to said parting plane and spaced therefrom a predetermined distance to define the emmersion depth of said rotational positioner into said supporting shell;

said end wall comprising a plurality of projecting webs on the exterior thereof extending essentially perpendicular to said attachment surface and transversely of said end wall; and means extending through said projecting webs for attaching said rotational positioner to said attachment surface.

2. The housing of claim 1, wherein:

said disk pack is a preassembled structural unit comprising said axial spindle which includes a pair of spindle pegs at opposite ends thereof, a pair of bearings each frictionally attached to a respective spindle peg and a pair of bearing bushings each frictionally attached to a respective bearing;

said first lateral wall comprises an edge along said parting plane, means defining a slot in said edge including a 180° curvature corresponding to the curvature of a bearing bushing for receiving one of said bearing bushings therein and means securing said one bearing bushing to said first lateral wall;

said second lateral wall including means defining a bore coaxial with the axis of rotation of said disk pack, and a spring means is provided to engage the other of said bearing bushings, and a screw is provided and extends through said bore to secure said spring means and thus supports the respective end of said spindle.

3. The housing of claim 1, wherein:

said rotational positioner is a preassembled structural unit and comprises:

a U-shaped pedestal including a base and a pair of upstanding legs extending from said base;

a pivot shaft connected to the distal ends of said legs, a pivot arm connected to said pivot shaft and including a first end and a magnetic head carried by said first end to pivot adjacent the respective magnetic disk, and a second end extending between said legs, said legs and said second end each comprising magnetic drive elements for said positioner.

4. The housing of claim 1, wherein:

said end wall comprises at least one stop extending from said attachment surface for alignment of said positioner with respect to said disk pack.

5. The housing of claim 3, wherein:

said predetermined angle and said pivot arm dimensions are selected such that said rotational positioner may be attached to said attachment surface with said magnetic head positioned outside of said disk pack.

6. The housing of claim 1, wherein:

said end wall comprises a web projecting into the interior space of said support shell between said rotational positioner and said disk pack for reinforcing said first and second lateral walls.

7. The housing of claim 6, wherein:

said web comprises a contour complementary to and spaced from said disk pack to form a flow channel for air during operation of said disk memory; and said housing further comprises an air filter mounted in a corner formed by said end wall and said first and second lateral walls and traversing the air flow channel.

8. The housing of claim 1, and further comprising:

additional outwardly projecting webs extending between and generally at a right angle to the first-mentioned webs.

9. The housing of claim 1, wherein said cover comprises:

means defining at least one external recess for mounting hybrid assemblies on the exterior thereof.

10. The housing of claim 1, wherein:

said support shell and said cover each comprise a peripheral edge;

said cover comprises a peripheral recess in its peripheral edge; and a peripheral seal is disposed in said peripheral recess so that when said cover and said shell are connected to one another a dust-tight seal and a high frequency shield is provide for said memory.

* * * * *